United States Patent
Kassai et al.

(10) Patent No.: US 7,458,599 B2
(45) Date of Patent: Dec. 2, 2008

(54) LUGGAGE BASKET AND FOLDING BABY CARRIAGE PROVIDED WITH THE SAME

(75) Inventors: Kenzou Kassai, Osaka (JP); Ichiro Ohnishi, Nara (JP)

(73) Assignee: Aprica Ikujikenkyukai Aprica Kassai Kabushikikaisha, Osaka-shi (JP)

( * ) Notice: Subject to any disclaimer, the term of this patent is extended or adjusted under 35 U.S.C. 154(b) by 555 days.

(21) Appl. No.: 11/115,961

(22) Filed: Apr. 26, 2005

(65) Prior Publication Data

US 2005/0258618 A1    Nov. 24, 2005

(30) Foreign Application Priority Data

May 20, 2004    (JP)    ............... 2004-150848

(51) Int. Cl.
*B62B 9/00*    (2006.01)
(52) U.S. Cl. ............... 280/642; 280/643; 280/644; 280/647; 280/47.38
(58) Field of Classification Search ............... 280/642, 280/643, 644, 647, 47.38
See application file for complete search history.

(56) References Cited

U.S. PATENT DOCUMENTS

| | | | |
|---|---|---|---|
| 4,763,919 A | | 8/1988 | Nakao et al. |
| 4,817,982 A | * | 4/1989 | Kassai ............... 280/644 |
| 4,953,887 A | * | 9/1990 | Takahashi et al. ............ 280/647 |
| 5,622,377 A | * | 4/1997 | Shamie ............... 280/642 |
| 5,741,021 A | | 4/1998 | Saint et al. |
| 5,882,030 A | * | 3/1999 | Haut ............... 280/642 |
| 5,988,670 A | * | 11/1999 | Song et al. ............... 280/648 |
| 6,139,046 A | * | 10/2000 | Aalund et al. ............... 280/642 |
| 6,189,914 B1 | * | 2/2001 | Worth et al. ............... 280/642 |
| 6,443,479 B2 | * | 9/2002 | Huang ............... 280/642 |
| 6,581,957 B1 | * | 6/2003 | Lan ............... 280/642 |
| 6,626,451 B1 | * | 9/2003 | Song ............... 280/642 |
| 6,712,382 B2 | * | 3/2004 | Song ............... 280/642 |
| 2005/0161912 A1 | * | 7/2005 | Cheng et al. ............... 280/647 |
| 2005/0258620 A1 | * | 11/2005 | Pike et al. ............... 280/647 |

FOREIGN PATENT DOCUMENTS

| | | |
|---|---|---|
| EP | 0 301 990 | 2/1989 |
| JP | 03-024969 | 3/1991 |

* cited by examiner

*Primary Examiner*—Paul N Dickson
*Assistant Examiner*—Jacob Meyer
(74) *Attorney, Agent, or Firm*—W. F. Fasse; W. G. Fasse

(57) ABSTRACT

A folding baby carriage comprises a body so constituted that a seat and a backrest part approach each other in a folding operation, and a luggage basket positioned under the seat. The luggage basket comprises a front frame extending backward and forward under the seat, a rear frame turnably connected to a rear end of the front frame and extending backward and forward, and a lock mechanism preventing the rear frame being turned around the front frame. The rear frame is turned so as to take a lower position in which a rear part of the luggage basket is opened, a horizontal position in which it extends almost horizontally, and an upper position in which its rear end approximates the backrest part. The lock mechanism comprises horizontal position fixing means for fixing the rear frame in the horizontal position.

9 Claims, 5 Drawing Sheets

LUGGAGE BASKET AND FOLDING BABY CARRIAGE PROVIDED WITH THE SAME

BACKGROUND OF THE INVENTION

1. Field of the Invention

The present invention relates to a baby carriage and more particularly, to a luggage basket positioned under a seat and a folding baby carriage provided with it.

2. Description of the Background Art

A baby carriage on which a large luggage basket is mounted under a seat has been provided in the market. According to this kind of baby carriage, a frame forming an upper opening of a luggage basket largely extends backward.

In a case of a baby carriage in which a backrest part is reclined to be in almost a horizontal state, when the backrest part is reclined to be in the horizontal state, since an upper opening of the luggage basket is covered with the backrest part, it is difficult to take goods in and out.

A basket for a baby carriage to solve the above problem is disclosed in Laid-Open Japanese Utility Model Publication No. 3-24969. According to the basket for the baby carriage disclosed in the above document, a rear half part of a frame forming an upper opening can be bent downward according to need. Thus, even when a backrest is reclined to be in almost a horizontal state, goods can be put in and out regardless of their structure.

However, the basket for the baby carriage disclosed in the Laid-Open Japanese Utility Model Publication No. 3-24969 does not have a structure which can follow a folding operation of the baby carriage. Although there is no description of the folding operation of the baby carriage in this document, judging from the structure of the basket, it is thought that the baby carriage cannot be folded with the basket mounted thereon. Therefore, when the baby carriage is folded, it is thought that it is necessary to dismount the basket from the baby carriage.

SUMMARY OF THE INVENTION

It is an object of the present invention to provide a luggage basket having a structure in which goods can be easily taken in and out and a folding operation of a baby carriage can be followed.

A folding baby carriage according to the present invention has a seat and a backrest part and comprises a body so constituted that the seat and the backrest part approach each other in a folding operation, and a luggage basket positioned under the seat. The luggage basket comprises a front frame extending backward and forward under the seat, a rear frame turnably connected to a rear end of the front frame and extending backward and forward, and a lock mechanism preventing the rear frame being turned around the front frame. The rear frame is turned so as to take a lower position in which a rear part of the luggage basket is opened, a horizontal position in which it extends almost horizontally, and an upper position in which its rear end approximates the backrest part. The lock mechanism comprises horizontal position fixing means for fixing the rear frame in the horizontal position.

According to the folding baby carriage having the above constitution, since the rear frame of the luggage basket can be turned upward to a position in which it can be in line with the backrest part, the baby carriage can be folded with the luggage basket mounted thereon.

Preferably, when the rear frame is in the upper position, it is allowed to be turned around the front frame. In this case, the baby carriage comprises a connecting member connecting a rear end of the rear frame in the upper position to the body. In this constitution, the rear frame can be turned upward to follow the folding operation of the baby carriage, changing its angle to the front frame.

According to one embodiment, the rear frame has a U-shaped configuration comprising a pair of side frames extending backward and forward and a rear end frame connecting rear ends of the pair of side frames. The lock mechanism comprises a pair of displacement members which can be displaced backward and forward at front ends of the pair of side frames, engaging means for engaging with the pair of displacement members at the rear end of the front frame to fix the position of the rear frame, and unlocking means for canceling an engaging state between the pair of displacement members and the front frame. The unlocking means comprises an operation member mounted on the rear end frame so that its position can be changed, and a connecting member connecting the operation member to the pair of displacement members. In this constitution, a locking state between the front frame and the rear frame can be easily unlocked by operating the operation member positioned at the rear end frame.

In addition, according to one embodiment, the rear frame has a Unshaped configuration comprising a pair of side frames extending backward and forward and a rear end frame connecting rear ends of the pair of side frames. The lock mechanism comprises a pair of displacement members which can be displaced backward and forward at front ends of the pair of side frames, engaging means for engaging with the pair of displacement members at the rear end of the front frame to fix the position of the rear frame, and unlocking means for canceling an engaging state between the pair of displacement members and the front frame. Engaging means of the front frame comprises an engagement recess which accepts the displacement member when the rear frame is in the horizontal position so as to prevent the displacement member and the rear frame from being moved in a vertical direction, a stopper which abuts on the displacement member from beneath when the rear frame is in the lower position to prevent the displacement member and the rear frame from being moved downward, and an abutment guide face which abuts on a tip end of the displacement member when the rear frame is in the upper position to allow the displacement member and the rear frame to be turned.

A luggage basket for a baby carriage according to the present invention comprises a front frame extending backward and forward under a seat of the baby carriage and fixed to a baby carriage body, a rear frame turnably connected to a rear end of the front frame and extending backward and forward, a lock mechanism preventing the rear frame from being turned around the front frame, and a container hanging from the front frame and the rear frame. The rear frame is turned to take a lower position in which a rear part of the container is opened, a horizontal position in which it extends almost horizontally, and an upper position in which its rear end approximates a backrest part of the baby carriage. The lock mechanism comprises horizontal position fixing means for fixing the rear frame in the horizontal direction.

According to the luggage basket having the above constitution, even when the backrest part is reclined to be in the almost horizontal state, for example, goods can be easily taken in and out by bringing the rear frame to the lower position. Furthermore, since the rear frame can be turned upward to the position in which it can be in line with the backrest part, the baby carriage can be folded with the luggage basket mounted thereon.

BRIEF DESCRIPTION OF THE DRAWINGS

FIG. 8 is a schematic sectional view showing a state in which the operation member is pressed in.

DESCRIPTION OF THE PREFERRED EMBODIMENTS

Figure 1:
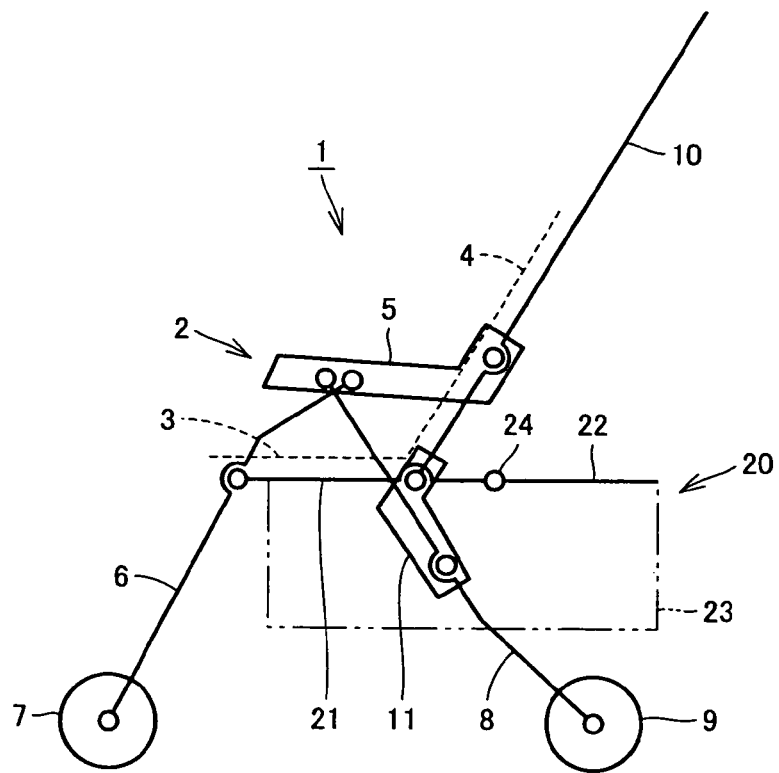
FIG. 1 is a side view schematically showing a folding baby carriage according to an embodiment of the present invention.

FIGS. 1 to 4 schematically show a folding baby carriage comprising a luggage basket according to an embodiment of the present invention. First, referring to FIG. 1, a description will be made of a schematic constitution of a folding baby carriage 1.

The folding baby carriage comprises a body 2 comprising a seat 3 and a backrest part 4 which approach each other in a folding operation, and a luggage basket 20 disposed under the seat 3.

The body 2 further comprises a handrail member 5 extending backward and forward, a front leg 6 having a front wheel 7, whose upper end is turnably connected to the handrail member 5, a rear leg 8 having a rear wheel 9, whose upper end is connected to the handrail member 5, a reversal bracket 11 whose lower end is turnably connected to the rear leg 8, and a push rod 10 extending in a vertical direction, whose lower end is turnably connected to an upper part of the reversal bracket 11. A rear end of the handrail member 5 is turnably connected to a middle part of the push rod 10.

The luggage basket 20 comprises a front frame 21 extending backward and forward under the seat, a rear frame 22 turnably connected to a rear end of the front frame 21 through a connection axis 24 and extending backward and forward, a lock mechanism 30 (refer to FIG. 5) which prohibits the rear frame 22 from being turned around the front frame 21, and a bag-shaped container 23 hanging from the front frame 21 and the rear frame 22. The container 23 is preferably formed of a cloth or mesh which is a flexible material.

Figure 5:
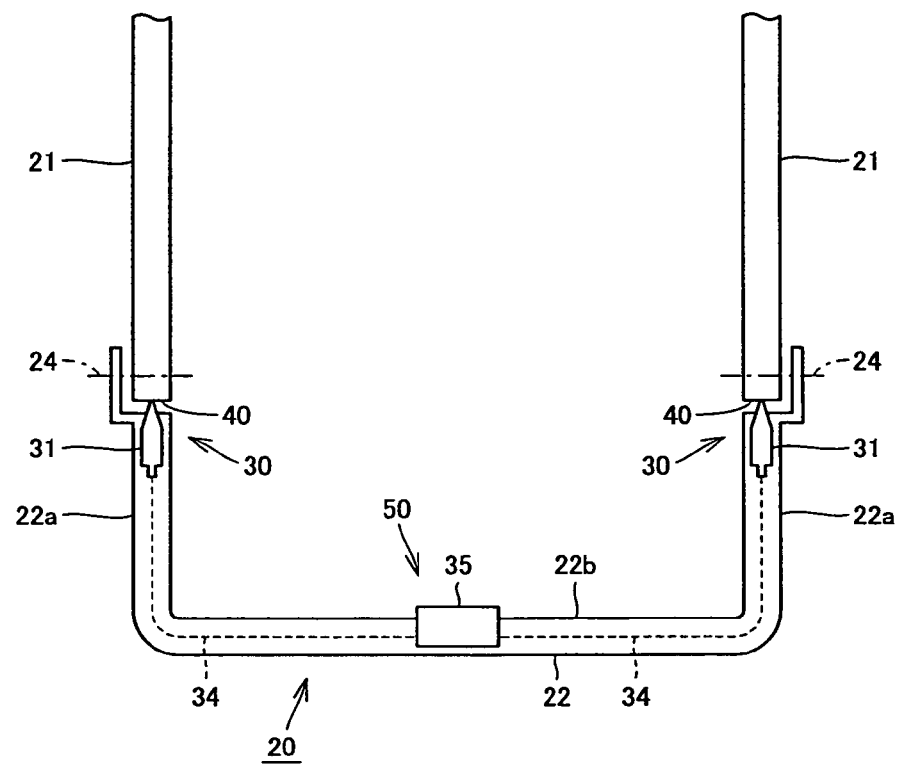
FIG. 5 is a schematic plan view showing a connection part between a front frame and the rear frame of the luggage basket.

According to the illustrated embodiment, the front frame 21 of the luggage basket 20 serves also as a seat supporting member which supports the seat 3 from beneath. The front frame 21 is turnably connected to an upper part of the reversal bracket 11 at its middle part. The rear end of the front frame 21 extends backward beyond the reversal bracket 11. The rear frame 22 turnably connected to the rear end of the front frame 21 further extends backward. As shown in FIG. 5, the rear frame 22 is in the form of U shape comprising a pair of side frames 22a extending backward and forward and a rear end frame 22b connected to rear ends of the pair of side frames 22a. As shown in FIG. 1, since the rear frame 22 forming an upper opening through which goods are taken in and out largely extends backward, the goods can be easily taken in and out.

Figure 2:
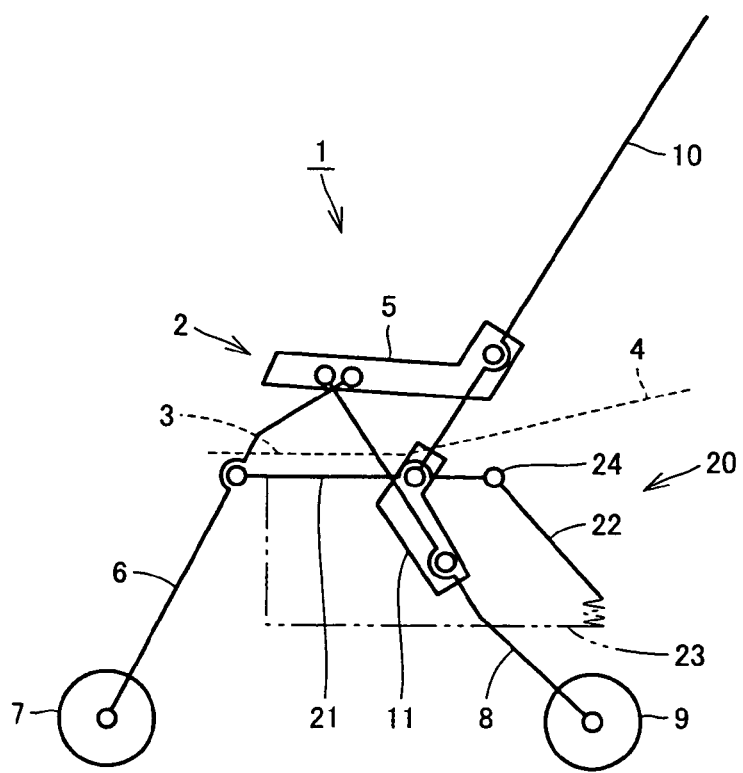
FIG. 2 is a schematic side view showing the baby carriage in which a rear frame of a luggage basket is brought to a lower position.
Figure 3:
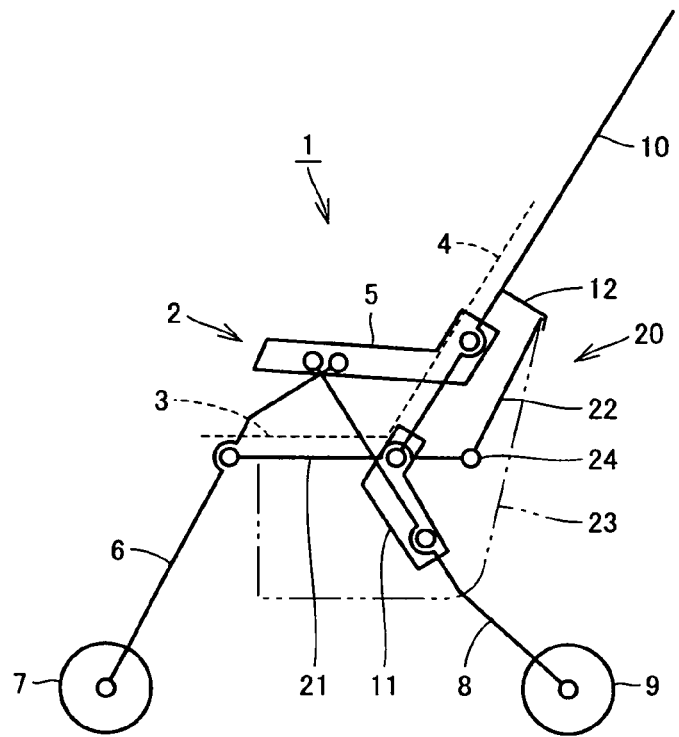
FIG. 3 is a schematic side view showing the baby carriage in which the rear frame of the luggage basket is brought to an upper position.

As can be clear from a comparison between FIG. 1, FIG. 2 and FIG. 3, the rear frame 22 of the luggage basket 20 is provided so as to take a lower position (a state shown in FIG. 2) in which a rear part of the luggage basket 20 is opened, a horizontal position (a state shown in FIG. 1) in which it extends almost horizontally, and an upper position (a state shown in FIG. 3) in which its rear end approximates the backrest part 4. The lock mechanism 30 (refer to FIG. 5) comprises horizontal position fixing means for fixing the rear frame 22 in the horizontal position.

When the baby carriage 1 is moved in a state in which the backrest part 4 is raised, the rear frame 22 is fixed in the horizontal position as shown in FIG. 1. As shown in FIG. 2, when the baby carriage is moved in a state in which the backrest part 4 is reclined to the almost horizontal position, in order to put the goods in and out of the basket, the rear frame 22 is brought to the lower position. When the rear frame 22 is in the lower position, since the rear part of the luggage basket 20 can be opened, the article can be easily taken in and out.

When the baby carriage 1 is folded, as shown in FIG. 3, the rear frame 22 is brought to the upper position so as to be in line with the backrest part 4. The rear frame 22 in the upper position is not fixed to the front frame 21 but follows the folding operation of the baby carriage, changing an angle to the front frame. The baby carriage 1 comprises a connecting member 12 which connects the rear end of the rear frame 22 in the upper position to the baby carriage body 2.

Figure 4:
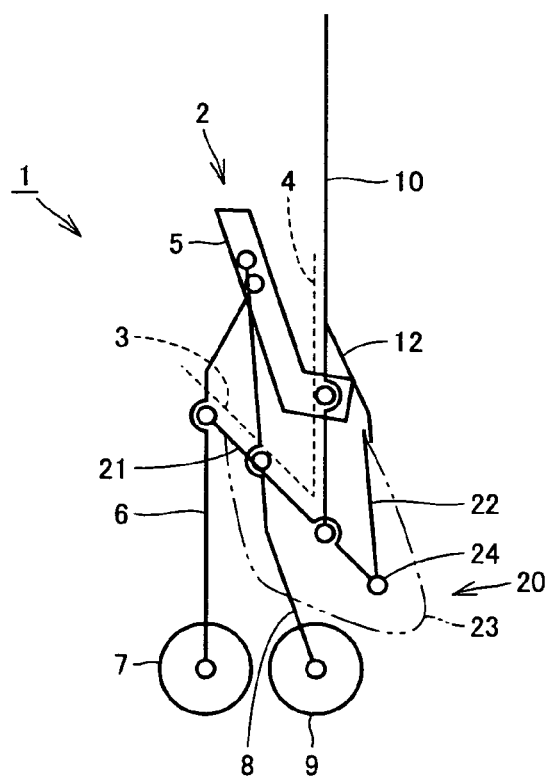
FIG. 4 is a schematic side view showing the baby carriage in a folded state.

As shown in FIG. 4, according to the folded baby carriage 1, the front wheel 7 and the rear wheel 9 are close to each other and stand by themselves. The rear frame 22 of the luggage basket 20 is positioned along the backrest part 4 when the baby carriage 1 is in the folded state, and the flexible container 23 is bent along the front frame 21 and the rear frame 22. In addition, the reversal bracket 11 is not shown in FIG. 4.

The lock mechanism 30 and an unlock mechanism will be described with reference to FIGS. 5 to 9.

Figure 6:
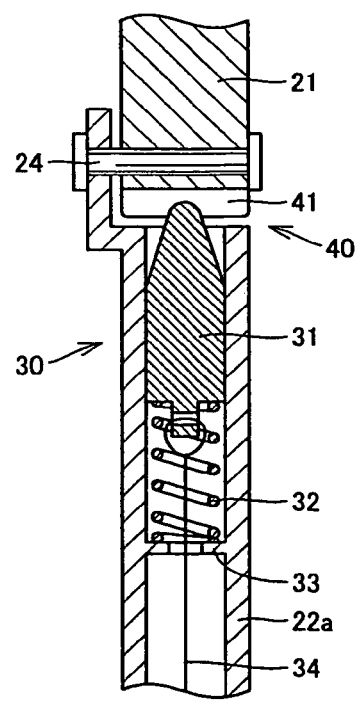
FIG. 6 is a schematic sectional view showing a state in which a displacement member positioned at a front end of the rear frame engages with a rear end of the front frame.

As shown in FIGS. 5 and 6, the lock mechanism 30 comprises a pair of displacement members 31 which can be displaced backward and forward at front ends of the pair of side frames 22a, an engaging means 40 for engaging with the pair of displacement members 31 to fix the position of the rear frame 22 at the rear end of the front frame 21, and unlocking means for unlocking an engagement state between the displacement member 31 and the front frame 21. Each displacement member 31 can be moved backward and forward along inner walls of the side frame 22a and forced to be moved forward by a spring 32 supported by a spring bearing 33.

Figure 7:
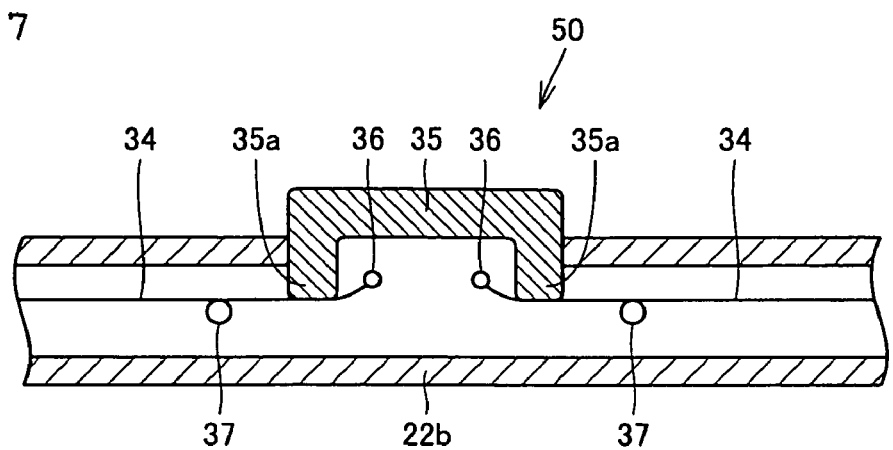
FIG. 7 is a sectional view schematically showing a structure regarding an operation member mounted on a rear end frame of the luggage basket.
Figure 8:
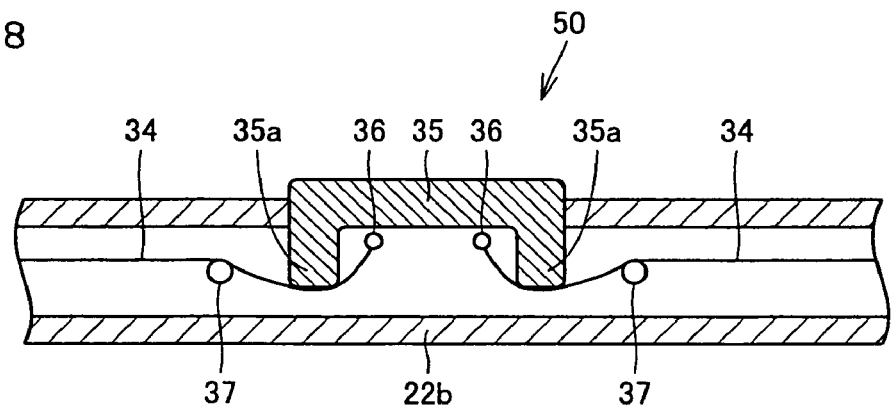

As shown in FIGS. 7 and 8, unlocking means 50 comprises an operation member 35 mounted on the almost center of the rear end frame 22b of the rear frame 22 so that it can be displaced, and a connecting member 34 which connects the operation member 35 and the pair of displacement members 31. According to the illustrated embodiment, the connecting member 34 is a pair of wires and one end of the wire 34 is connected to the displacement member 31 and the other end passes through a guide pin 37 and it is fixed to the rear end frame 22b at a fixing point 36 positioned in an inner region of the operation member 35. The operation member 35 comprises a pair of projections 35a to push the pair of wires 34 backward.

In a state in which the displacement member 31 is moved forward and engages with the rear end of the front frame 21, the operation member 35 projects outward from a wall of the rear end frame 22b as shown in FIG. 7. When the operation member 35 is pushed inward from this state, since the pair of projections 35a pushes the pair of wires 34 backward as shown in FIG. 8, the pair of displacement members 31 is pulled by the pair of wires 34 backward, so that the engagement state with the front frame 21 is canceled. Since the operation member 35 can be handled by one hand, the unlocking operation is simple.

Figure 9:
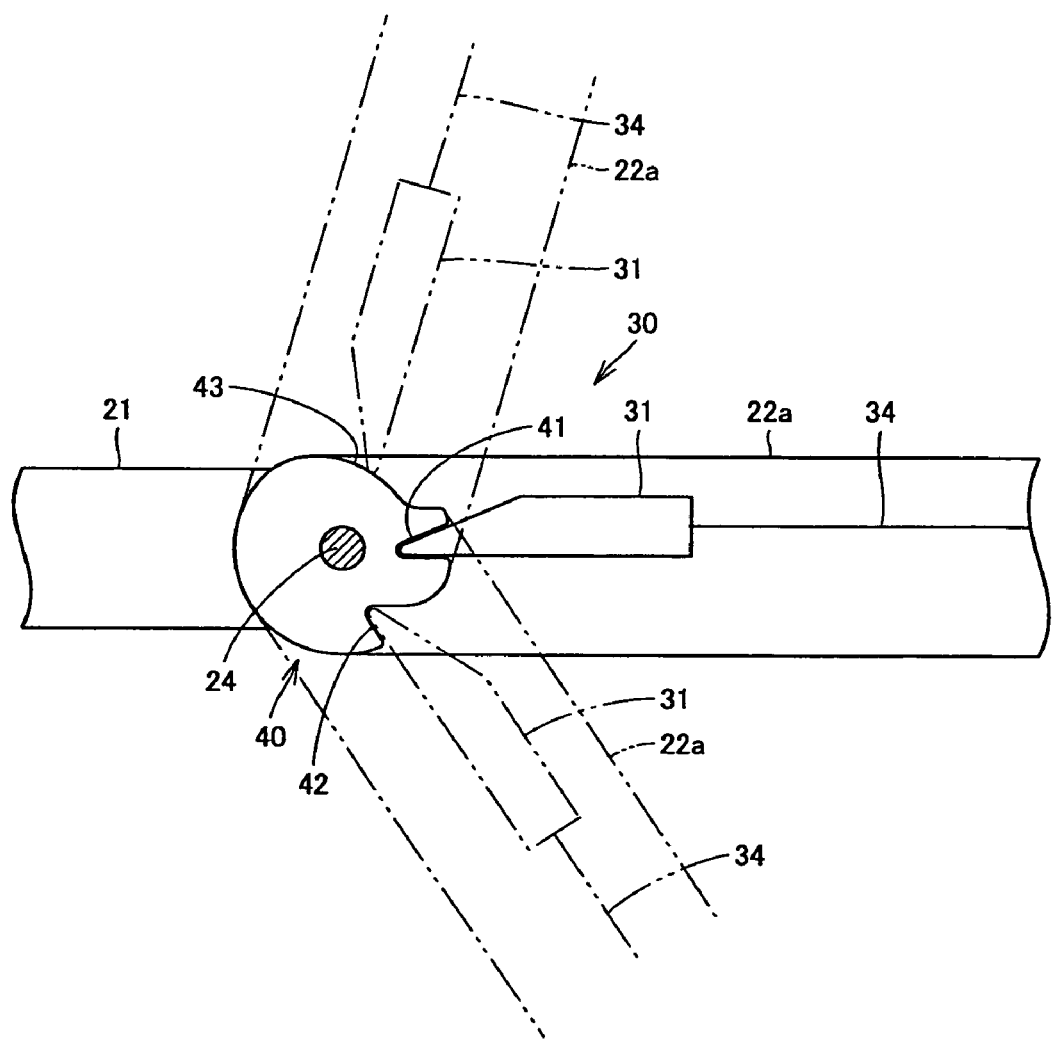
FIG. 9 is a schematic view showing a state in which the rear end of the front frame engages with the front end of the rear frame.

FIG. 9 schematically shows engaging means 40 provided at the rear end of the front frame 21. The engaging means 40 comprises an engagement recess 41, a stopper 42, and abutment guide face 43 around the connection axis 24. The engagement recess 41 accepts the displacement member 31 when the rear frame 22 is in the horizontal position. Since the displacement member 31 and the rear frame 22 are prevented from being moved in the vertical direction in a state in which the engagement recess 41 engages with a tip end of the displacement member 31, the rear frame 22 is fixed in the horizontal direction.

When the rear frame 22 is to be brought to the lower position, the operation member 35 is operated such that the displacement member 31 is pulled backward and escapes from the engagement recess 41. In this state, the rear frame 22 is turned in the lower direction and the operation member 35 is released. The stopper 42 of the engaging means 40 abuts on the displacement member 21 from beneath when the rear frame 22 is in the lower position to prohibit the displacement member 31 and the rear frame 22 from being moved further in the lower direction.

When the rear frame 22 is to be brought to the upper position, the operation member 35 is operated so that the displacement member 31 is pulled backward and escapes from the engagement recess 41. In this state, the rear frame 22 is turned upward and the operation member 35 is released. The abutment guide face 43 of the engaging means 40 abuts on the tip end of the displacement member 31 when the rear frame 22 is in the upper position so as to allow the displacement member 31 and the rear frame to be turned. That is, when the tip end of the displacement member 31 is on the abutment guide face 43, the displacement member 31 and the rear frame 22 can be moved, changing an angle to the front frame 21 freely.

As shown in FIGS. 3 and 4, when the rear frame 22 is in the upper position, since its rear end is connected to the baby carriage body 2 through the connection member 12, the rear frame 22 follows the folding operation of the baby carriage so as to be turned forward, changing an angle to the front frame 21.

Although the front frame 21 of the luggage basket 20 serves as the seat supporting member also which supports the seat from beneath in the illustrated embodiment, the front frame and the seat supporting member may be separately provided.

Although the embodiment of the present invention has been described with reference to the drawings, the present invention is not limited to the illustrated embodiment. Various modifications and alterations might be made in the illustrated embodiment without departing from the spirit and scope of the invention.

The present invention can be effectively applied to a large luggage basket for a baby carriage and a folding baby carriage provided with that basket.

What is claimed is:

1. A folding baby carriage having a seat and a backrest part, comprising:
   a body so constituted that the seat and the backrest part approach each other in a folding operation; and
   a luggage basket positioned under said seat, wherein
   said luggage basket comprises a front frame extending backward and forward under said seat, a rear frame turnably connected to a rear end of said front frame and extending backward and forward, and a lock mechanism selectively preventing said rear frame from being turned around said front frame,
   said rear frame is turnable selectively so as to take a lower position in which a rear part of said luggage basket is opened, a horizontal position in which said rear frame extends almost horizontally, and an upper position in which a rear end of said rear frame approximates said backrest part, and
   said lock mechanism comprises horizontal position fixing means for selectively fixing said rear frame in the horizontal position.

2. The folding baby carriage according to claim 1, wherein when said rear frame is in said upper position, said rear frame is allowed to be turned around said front frame, and
   said baby carriage comprises a connecting member connecting said rear end of said rear frame in said upper position to said body.

3. The folding baby carriage according to claim 1, wherein said rear frame has a U-shaped configuration comprising a pair of side frames extending backward and forward and a rear end frame connecting rear ends of the pair of side frames,
   said lock mechanism comprises a pair of displacement members which can be displaced backward and forward at front ends of said pair of side frames, engaging means for engaging with said pair of displacement members at the rear end of said front frame to fix the position of said rear frame, and unlocking means for canceling an engaging state between said pair of displacement members and said front frame, and
   said unlocking means comprises an operation member movably mounted on said rear end frame so that a position of said operation member can be changed, and a connecting member connecting said operation member and said pair of displacement members.

4. The folding baby carriage according to claim 1, wherein said rear frame has a U-shaped configuration comprising a pair of side frames extending backward and forward and a rear end frame connecting rear ends of the pair of side frames,
   said lock mechanism comprises a pair of displacement members which can be displaced backward and forward at front ends of said pair of side frames, engaging means for engaging with said pair of displacement members at the rear end of said front frame to fix the position of said rear frame, and unlocking means for canceling an engaging state between said pair of displacement members and said front frame, and
   said engaging means comprises an engagement recess which accepts a respective one of said displacement members when said rear frame is in the horizontal position so as to prevent said displacement member and said rear frame from being turned upwardly or downwardly relative to said front frame, a stopper which abuts on said displacement member from beneath when said rear frame is in the lower position to prevent said displacement member and said rear frame from being turned farther downward relative to said front frame, and an abutment guide face which abuts on a tip end of said displacement member when said rear frame is in the upper position to allow said displacement member and said rear frame to be turned relative to said front frame.

5. A luggage basket for a baby carriage comprising:

a front frame extending backward and forward under a seat of the baby carriage and being fixed to a baby carriage body of the baby carriage;

a rear frame turnably connected to a rear end of said front frame and extending backward and forward;

a lock mechanism selectively preventing said rear frame from being turned around said front frame; and a container hanging from said front frame and said rear frame, wherein said rear frame is turnable selectively to take a lower position in which a rear part of said container is opened, a horizontal position in which said rear frame extends almost horizontally, and an upper position in which a rear end of said rear frame approximates a backrest part of the baby carriage, and a said lock mechanism comprises horizontal position fixing means for fixing said rear frame in said horizontal position.

6. A foldable baby carriage comprising:

a carriage body including a seat and a backrest that are pivotable relative to one another, a pair of front legs carrying front wheels at bottom ends thereof, a pair of rear legs carrying rear wheels at bottom ends thereof, and a pushrod extending generally upwardly and tilted rearwardly, wherein at least said front legs, said rear legs and said pushrod are pivotally interconnected to enable said carriage body to be selectively folded between an unfolded condition and a folded collapsed condition; and a storage basket arranged under said seat and said backrest, and including a front frame that is pivotally connected to said front legs and extends from said front legs rearwardly beyond said rear legs, a rear frame that is pivotally connected to said front frame at left and right pivot points located rearwardly from said rear legs so that said rear frame is pivotable about said pivot points upwardly and downwardly relative to said front frame selectively to an upper position in which said rear frame extends generally upwardly and rearwardly proximate to and along said pushrod, a lower position in which said rear frame tilts downwardly from said left and right pivot points below a plane of said front frame, and a middle position in which said rear frame extends rearwardly from said left and right pivot points at an angular position between said upper and lower positions, a lock mechanism that is coupled to said front and rear frames and that is configured and adapted to selectively lock said rear frame and prevent pivoting of said rear frame about said pivot points relative to said front frame at least at said middle position of said rear frame, and a flexible basket body connected to and hanging downwardly from said front frame and said rear frame with an opening into said basket body bounded at least partially by said rear frame.

7. The foldable baby carriage according to claim 6, wherein said carriage body further includes a pair of pivot brackets having lower ends thereof respectively pivotally connected to said rear legs and upper parts of said pivot brackets pivotally connected to lower ends of said pushrod and to middle parts of said front frames.

8. The foldable baby carriage according to claim 6, wherein said carriage body further includes a pair of handrail members to which upper ends of said front and rear legs are pivotally connected, and which have rear ends of said handrail members respectively pivotally connected to a middle part of said pushrod.

9. The foldable baby carriage according to claim 6, wherein said seat is supported from beneath on said front frame.

* * * * *